Patented Aug. 12, 1924.

1,504,627

UNITED STATES PATENT OFFICE.

JAMES GRAHAM LAMB, OF DENVER, COLORADO, ASSIGNOR TO AMERICAN SMELTING AND REFINING COMPANY, OF NEW YORK, N. Y., A CORPORATION OF NEW JERSEY.

PROCESS OF TREATING NATIVE ARSENATE ORES.

No Drawing. Application filed February 1, 1921. Serial No. 441,682.

*To all whom it may concern:*

Be it known that I, JAMES GRAHAM LAMB, a citizen of the United States, and resident of Denver, in the county of Denver and State of Colorado, have invented certain new and useful Improvements in Processes of Treating Native Arsenate Ores, of which the following is a specification.

The invention relates to a new and improved process in the direct production of a soluble arsenate from native arsenical ores in which the arsenic is present in the arsenate form, without subjecting the ores to any previous metallurgical treatment and permitting the transfer of the soluble arsenate into an insoluble arsenate available for use as an insecticide, such as calcium arsenate.

One of the objects of the invention is to provide an improved and simplified process for treating arsenical ores so as to form calcium arsenate economically for use in insecticides and for other purposes and incidentally to form insecticides and the like without the intermediate production of white arsenic ($As_2O_3$) and in this way avoid all poisonous gases usually characterizing similar processes in the practicing of which white arsenic ($As_2O_3$) is formed.

The invention relates primarily to the formation of a sodium arsenate by basic reactions, and one preferred form of which consists in first treating the ore with caustic soda and then replacing the sodium with calcium to form the calcium arsenate.

More particularly defined the invention consists in crushing, drying and grinding the ore, or other material to a fineness permitting the desired reactions to take place within reasonable time limits, and if necessary to a fineness so that it may pass a hundred mesh screen; the pulverized ore is mixed with caustic soda, preferably in the proportion of 8 parts of ore to 3 parts of caustic soda, the latter preferably being in the form of a hot 50% aqueous solution.

There results from this treatment a thin paste which quickly becomes viscous and soon settles into a more or less porous solid; the solid is lixiviated with hot water and there results a solution which contains sodium arsenate and whatever excess of caustic soda may be present. The solid residue contains all the values in noble metals.

Slaked lime in an emulsion form is added to the strongly alkaline solution of sodium arsenate and calcium arsenate is precipitated therefrom in a finely divided granular form.

The precipitated calcium arsenate when washed, dried and pulverized is then ready for the market without necessity for further treatment and is practically free of any arsenic in water soluble form.

The mother liquid is evaporated preferably to a concentration of about 50% sodium hydroxide and is added to the caustic soda reagent mixed with the ores ground in the first step above recited. All the washed liquids are conserved and used to lixiviate the mixture in the preceding step where the porous solid is lixiviated with hot water.

In this way there is produced directly from the oxidized arsenical ores a form of calcium arsenate suitable for general commercial demands and which can be produced cheaply and without the use of expensive reagents or extensive operations.

The calcium arsenate is formed directly from the ore without forming white arsenic as an intermediate step and in this way the formation of poisonous gases and irritating dust is avoided.

Having thus described my invention, I claim:

1. In a process of making water soluble arsenates, treating native, raw, pentavalent arsenic bearing ores in a finely divided condition with a caustic alkali in the form of approximately a 50 per cent solution and effecting a reaction between said alkali and the arsenic compounds of said ore.

2. In a process of making water soluble arsenates, treating native, raw, pentavalent arsenic bearing ore with a strong caustic alkali solution of sufficient strength to form a porous solid and effecting a reaction between said alkali and the arsenic compounds of said ore.

3. In a process of making water soluble arsenates, treating crushed, native, raw, pentavalent arsenic bearing ore with caustic soda in the form of an approximately 50 per cent solution and effecting a reaction with the arsenic compounds of said ore.

4. In a process of making water soluble arsenates, treating native raw pentavalent arsenic ore in a finely divided condition with caustic soda in the form of a solution in strength and quantity sufficient to form a porous solid and to effect a reaction between said caustic soda and approximately all the arsenic compounds of said ore and then lixiviating the solid with water.

5. In a process of making water soluble arsenates, treating approximately eight parts of crushed, native, raw, pentavalent arsenic ore with approximately three parts of caustic soda in the form of approximately a fifty per cent aqueous solution and effecting a reaction between said caustic soda and the arsenic compounds of the ore.

6. In a process of making water soluble arsenates, forming a porous solid by treating approximately eight parts of native, raw, pentavalent arsenic ore in a finely divided condition with approximately three parts of caustic soda in the form of a hot approximately fifty per cent aqueous solution, effecting a reaction between said caustic soda and the arsenic compounds of said ore and allowing the mass to solidify and then lixiviating the solid with water.

Signed at Denver, in the county of Denver and State of Colorado, this 18th day of January, A. D. 1921.

J. GRAHAM LAMB.